(×600)

(×600)

3,814,642
MANUFACTURE OF CARBON SHAPED ARTICLES

Tadashi Araki and Kiro Asano, Tokyo, Junichi Kosugi, Urawa, and Fumio Tamura, Tokyo, Japan, assignors to Kureha Kagaku Kogyo Kabushiki Kaisha, Tokyoto, Japan
Filed Dec. 28, 1971, Ser. No. 212,966
Claims priority, application Japan, Dec. 29, 1970, 46/120,978, 46/120,979
Int. Cl. B32b 31/00
U.S. Cl. 156—60     5 Claims

ABSTRACT OF THE DISCLOSURE

Manufacture of carbon shaped article having gas impermeability, high hardness, and high mechanical strength by mixing organic fiber having particular physical properties with organic binder, or a mixture of the organic binder and an aggregate, and heat-treating the mixed material.

---

Figure 1:
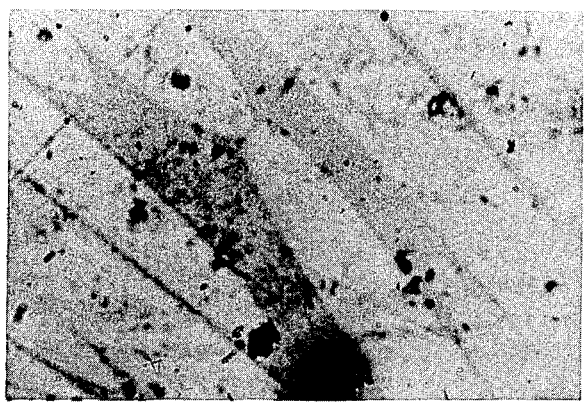

This invention is concerned with a method for production of carbon shaped article. More particularly, it relates to an improved method for manufacturing carbon shaped articles of gas impermeability, high hardness, and high mechanical strength, wherein a particular organic fiber or a mixture of such organic fiber and an inorganic or carbonaceous aggregate is blended with an organic binder, and heat-treated.

Heretofore, there have been practised the following three principal methods for the production of carbon shaped articles. The first method is to bind an appropriate fiber produced from cellulose, wool, polyacrylonitrile, polyvinyl alcohol, etc. with an appropriate binding material, and the mixture is subjected to heat-treatment; the second method is to bind an inorganic or carbonaceous aggregate with an organic binding material such as coal tar, coal pitch, petroleum tar and pitch, etc., and the mixture is subjected to heat-treatment; and the third method is to heat-treat a thermosetting resin such as phenol resin, etc.

These methods, however, are not capable of providing shaped articles of carbon having sufficiently high mechanical strength as well as any desired dimensional size. In other words, the first mentioned method is liable to cause considerable cracks in the produced articles due to the carbonization yield of the raw material used being low, hence large linear shrinkage. Thus the resultant article is defective in its mechanical strength. Moreover, a long span of time is required for the production, which is disadvantageous from the standpoint of industrialized manufacturing. The second method is liable to cause considerable voids within the shaped article as manufactured on account of the surface binding force between the binder and the aggregate being weak as well as large difference in shrinkage between them in the course of the carbonization, hence insufficient mechanical strength. For this reason, a re-impregnation operation is necessary for obtaining carbon shaped article of high mechanical strength, which inevitably accrues rise in cost and price of the articles. The third method is also incapable of limiting the linear shrinkage of the fibrous material to less than 25% since its carbonization yield is low, so that it is extremely difficult to prevent cracks from occurring at the time of production. In view of such defect in the raw material to be used, it has been said that shaped articles of a thickness of more than 5 mm. is impossible to be produced.

It has therefore been a conclusive opinion that the known methods as described in the foregoing are not useful for producing carbon shaped article of fluid impermeability, high hardness, and high mechanical strength.

It is therefore an object of the present invention to provide a method for producing the carbon shaped articles of such desirable high physical properties.

It is another object of the present invention to provide an improved method for producing such remarkably fluid imperameable, hard and strong carbon shaped article by blending appropriately selected organic fiber and organic binder with or without addition of aggregate thereto.

It is another object of the present invention to provide an improved method for producing such remarkably impermeable, hard and strong carbon shaped article which comprise mixing an organic fiber to serve as a base material as well as reinforcing material having an average diameter of less than 40 microns, a ratio between the fiber length and the diameter of more than 5, a hydrogen/carbon atomic ratio of from 0.25 to 0.8 based on the elementary analyses, an ether-bonded type oxygen content of from 3 to 15%, a carbonization yield of from 50 to 92%, and a linear shrinkage of from 4 to 25% at a temperature of 1,000° C. with an organic binding material having a carbonization yield of more than 10% with or without addition of an inorganic or carbonaceous aggregate thereto, and then heat-treating the blended material for carbonization or graphitization.

The foregoing objects and details of the inventive concept of the present invention will be more precisely explained hereinbelow with reference to the accompanying drawing as well as the preferred examples thereof.

Figure 2:
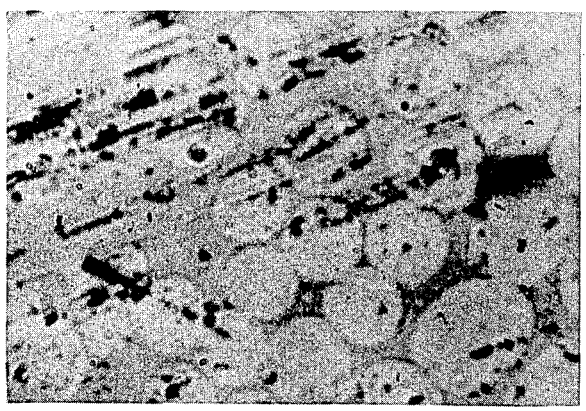

In the drawing:

FIG. 1 is a microphotograph showing a longitudinal cross-section of the carbon shaped article of the present invention; and FIG. 2 is also a microphotograph showing a cross-section of the carbon shaped article of the present invention same as that shown in FIG. 1 above.

It has been discovered by the present inventors that carbon shaped articles produced by using an organic binder having a carbonization yield of more than 50% possess remarkable gas impermeability, high hardness, and high mechanical strength which could not be attained by the heretofore known production method. It has also been verified that the carbon article of the present invention can be easily graphitized by further heat-treatment at a high temperature with remarkable improvement in its anti-oxidation property. It is also worthy of note that the carbon shaped articles of the present invention not only attains exceedingly superior increases in its mechanical strength at a normal temperature such as, for example, bending strength, compression strength, etc. in comparison with the conventional carbon shaped article, but also exhibits great difference in its strength in a hot condition such as at a temperature of 1,200° C. In addition, anti-spalling property thereof is satisfactory which results in the least consumption of the shaped article in actual use. Resistances to impact as well as heat shock are also extremely large with the consequent prolongation in its service life in comparison with the known article. Particularly, when electrode, carbon brick, etc. is produced from the mixture of such organic fiber and an aggregate bound by an organic binding material, the products exhibit very remarkable electrical characteristics, heat conductivity, etc.

The particular quality of the organic fiber to be used for the present invention is required to have the following various properties.

H/C atomic ratio _____ 0.25–0.8.
Ether-bonded oxygen _____ 3–15%.
Carbonization yield _____ 50–92% (preferably more than 70%).
Linear shrinkage at 1,000° C. ____ 4–25%.

The carbonization yield of from 50 to 92%, or preferably more than 70% signifies that the organic fiber is a precursor for ordinary carbon fiber, and is not the carbon fiber per se. When the carbonization yield exceeds 92%, the fiber becomes very similar to the so-called carbon fiber with the consequence that the fiber loses its affinity with the binder, and causes problem in respect of the shrinkage between the fiber and the binder. On the other hand, when it is less than 50%, shrinkage of the shaped article in the course of the heat-treating process after shaping becomes great to cause cracks to occur in the product, or the porosity of the product to increase, and various other disadvantages. That the organic fiber of the present invention having the above-mentioned carbonization yield is the precursor for the carbon fiber is well supported by the aforementioned structural definitions of the fiber, i.e., the H/C atomic ratio of from 0.25 to 0.8 and the ether-bonded type oxygen content of from 3 to 15% by weight.

The more important characterization of the organic fiber to be used for the method according to the present invention consists in the ether-bonded type oxygen content of from 3 to 15% by weight, the definition of which constitutes the largest factor to govern the mechanical strength of the carbon shaped article after the heat-treatment. In other words, the oxygen existing in the organic fiber of the present invention should not be a class of oxygen bonded with carbonyl group, quinone, phenol group, and others. It does not, of course, matter that the class of such oxygen bonded with other functional groups than ether exists in the organic fiber, provided that the ether-bonded oxygen of the abovementioned range concurrently exists in the fiber.

At the present stage, it is not possible to give clear theoretical reasoning why this particular type of oxygen constitutes the governing factor to the mechanical strength of the resulting carbon shaped article. The only presumption which can be given is that the energy of bonding due to the carbon-oxygen-carbon (C—O—C) bond is stronger than that due to the carbon-carbon (C—C) bond with the result that discharge of low molecular weight substances from the shaped body is least at the time of heat-treatment for carbonization, hence high carbonization yield and high mechanical strength of the produced article. Also, the oxygen content in the organic fiber increases affinity with an organic binder, which facilitates the blending operation to be carried out smoothly.

When the content of the ether-bonded oxygen exceeds 15% by weight, the H/C atomic ratio and the carbonization yield of the organic fiber inevitably become outside of the afore-described range. On the other hand, when the content of the oxygen is below 3% by weight, discharge of the low molecular weight substances at the time of carbonization is observed as is the case with oxygen bonded with other functional groups, hence considerable voids generate within the product to lower the mechanical strength thereof.

Besides the foregoing intrinsic definition, there exists the following extrinsic definition. This is the linear shrinkage of the organc fiber at a temperature of 1,000° C. According to this definition, the organic fiber to be used in the present invention is required to have the linear shrinkage at 1,000° C. of from 4 to 25%. When the linear shrinkage exceeds 25%, there tends to occur cracks in the shaped article after heat-treatment, which contributes less to the improvement in the mechanical strength of the shaped article. Also, when the shrinkage is below 4%, there exists extremely large difference in shrinkage between the fiber and the binder, which is liable to cause the cracks in the shaped body, and, moreover, the apparent density of the article to lower by restitution force during the heat-treatment process, thereby increasing voids in the article.

The other extrinsic definitions for this organic fiber are the fiber diameter of less than 40 microns as well as the ratio between the fiber length and the fiber diameter ($L/D$ ratio of more than 5. These limitations are the minimum requirements for the organic fiber to serve as the so-called reinforcement when it is added to the binder or a mixture of the binder and an aggregate as well as for maintaining uniformity in the blending operation of the fiber. That is, when the fiber length is too short, the reinforcing effect due to the added fiber becomes reduced to an appreciable degree.

The organic fiber which meets such requirements for the purpose of the present invention can be easily obtained by heat-treating at a temperature of from a normal temperature to 350° C. (1) fiber consisting of polyacrylonitrile, polyvinyl alcohol, lignin, cellulose, etc. as its principal constituent, (2) fiber consisting of a thermosetting resin such as phenol resin, furfural resin, etc., and (3) fiber melt-spun from pitch as the raw material. The heat-treatment is carried out in an oxidizing gas such as $NO_2$, $SO_3$, $O_2$, $O_3$, or air, or a mixture gas of more than two kinds of these gases. Chlorine gas is also useful for the purpose. After this oxidation treatment, the fiber may be contacted with ammonia or amines. Moreover, with a view to bringing the organic fiber for use in the present invention into the aforementioned respective ranges, it is permitted to further heat-treat the fiber to a temperature of 600° C. in an inert gas atmosphere.

The thus produced organic fiber is blended with an organic binding material or with a mixture of the organic binder and an aggregate, wherein the organic fiber may serve as either a base material to be bound by the organic binder or a reinforcing material for the mixture of the binder and the aggregate.

The aggregate to be used in the present invention include both inorganic aggregate such as various kinds of refractory clays, Schamott sand, doromite, siliceous stone, magnesia, alumina, zirconium oxide, silicon dioxide, silicon carbide, etc. and carbonaceous aggregate such as carbon, graphite, etc. The material aggregate for refractory brick which is bonded by C—C bond in the material exhibits its remarkable effect by blending of the organic fiber according to the present invention.

The organic binder necessary for binding the organic fiber or the aggregate is a substance having the carbonization yield of more than 10%. Examples of such organic binder are: coal tar, coal pitch, petroleum pitch, petroleum tar, polyvinyl chloride, polyvinylidene chloride, polyacrylonitrile, phenol resin, epoxy resin, diarylphthalate, furfural resin, unsaturated polyester resin, and so forth. In particular, when the thermosetting resins such as phenol resin, furfural resin, furfural alcohol resin, etc., or these resins as modified by pitch, each of these resins having the carbonization yield of more than 50%, are used as the organic binder, carbon shaped articles of remarkable fluid impermeability, high hardness, and high mechanical strengh can be readily obtained.

A preferable range of blending this organic binder with the organic fiber is from 20 to 150 parts by weight of the binder with respect to 100 parts by weight of the organic binder. When the quantity exceeds 150 parts, the mechanical strength of the carbon shaped article is recognized to be lowered, and, when it is below 20 parts by weight, porosity of the shaped article becomes prohibitive. Accordingly, the above-specfied range is particular for the carbon shaped article required to have sufficient gas impermeability. For the shaped articles not required to have such strict gas impermeability, the blending quantity of the binder may be increased to 200 parts by weight or so depending on the circumstances, with which carbon shaped articles of far more excellent quality than that of the known product can be obtained.

The adding quantity of the organic fiber to serve as the reinforcing material, when the inorganic or carbonaceous aggregate is added to the raw material, usually ranges from 0.2 to 40 parts by weight with respect to 100 parts by weight of the mixture of the organic binder and the aggregate.

There is no necessity of giving any particular consideration as to blending of the organic fiber, organic binder, and aggregate. They can simply be blended in uniform manner by an ordinary blending apparatus. In some case, it is possible to apply on the surface of the aggregate both organic binder and organic fiber.

As stated in the foregoing, the organic fiber of the present invention is very simple in its handling such that it can be readily blended with organic binder or a mixture of the organic binder and the aggregate without requiring any substantial modification to the existing blending machine with yet remarkable improvement in physical properties of the carbon shaped article after heat-treatment. The thus produced carbon shaped article is excellent in its graphitizability in comparison with ordinary glassy carbon, and possesses porosity of less than 3% up to substantially 0%. Its electrical characteristics as well as resistances against heat shock and impact are also excellent. Moreover, there is no limitation to the thickness of the shaped article as has been encountered in the conventional article, and the organic fiber itself can be made into any desired shape such as paper, felt, net, etc., the industrial advantage of which is extremely great.

With a view to enabling persons skilled in the art to reduce the present invention into practice, the following preferred examples are presented. It should, however, be noted that these examples are illustrative only, and any change and modification in the raw material, ingredients, as well as the treating conditions may be done within the scope of the present invention as afforded by the appended claims.

post-treatments as shown in Table 1 below to produce the fiber containing therein ether-bonded type oxygen at different contents. The properties of the resulted fiber also appear in the same Table 1.

TABLE 1

| Specimen number | Heat-treatment conditions | | Ether-bonded type oxygen content (percent) | H/C atomic ratio | Carbonization yield (percent) | Linear shrinkage at 1,000° C. (percent) |
|---|---|---|---|---|---|---|
| | Atmosphere | Time (min.) | | | | |
| 1 | At 250° C. in oxidizing atmosphere containing 3 vol. percent of NO₂ | 60 | 10 | 0.42 | 75 | 20 |
| 2 | At 300° C. in nitrogen | 120 | 8 | 0.04 | 78 | 15 |
| 3 | At 600° C. in nitrogen | 80 | 4 | 0.25 | 92 | 5 |
| 4 | At 350° C. in air containing 3 vol. percent of NO₂ | 100 | 15 | 0.33 | 80 | 21 |
| 5 | At 450° C. in nitrogen using Specimen 4 | | 8 | 0.30 | 84 | 12 |

NOTE.—The properties of the respective specimen fibers were measured by the under-defined manners:
1. H/C atomic ratio ..... calculation of hydrogen and oxygen by the elementary analyses.
2. Ether-bonded type oxygen ..... estimation from the results of determination of the oxygen content by the elementary analyses, determination of the functional groups of —COOH, >C=O, —OH, C—O—C due to the infrared ray absorption spectrum as well as chemical analyses and determination of the peroxy group due to iodometry.
3. Carbonization yield ..... estimation from the carbon fiber at its percentage by weight remaining after treating the specimen fiber in an argon gas by raising the heating temperatureup to 1,000° C. at a rise rate of 3° C./min.
4. Linear shrinkage ..... measurement of the specimen fiber length when heated to 1,000° C.

The various kinds of organic fibers shown in Table 1 above was then blended with various sorts of organic binders, and shaped into test pieces, each having a dimension of 100 cm. long, 50 cm. wide, and 5 cm. thick, after which the test pieces were heated in air by gradually elevating the temperature from a normal temperature to 250° C. at a rise rate of 2° C./min., thereafter they were further heated to a temperature of 1,000° C. for carbonization at a temperature rise rate of 10° C./min.

The shaped carbon articles thus obtained were measured for their properties, the results of which are as shown in Table 2 below. For the purpose of comparison, phenol resin was heat-treated under the same conditions as mentioned in the above with the consequent failure to obtain the shaped carbon article of the same dimension as that of the abovementioned specimens.

As is apparent from Table 2, remarkable effect can be recognized on the fluid impermeability, high hardness, and high mechanical strength of the shaped carbon article from using the organic fiber according to the present invention.

Incidentally, FIGS. 1 and 2 of the accompanying drawing are the cross-sectional micro-photographs of the specimen resulted from the Run No. 2 in this Table, when clearly show that the high density state is realized in the shaped product by the use of the organic fibers according to the present invention.

TABLE 2

| | Organic fiber | | | Organic binder | | Properties of shaped articles | | | | |
|---|---|---|---|---|---|---|---|---|---|---|
| Run No. | Specimen No. | L/D | Qty. (wt. part) | Kind | Qty. (wt. part) | Bulk density | Porosity (percent) | Bending strength (kg./cm.²) | Share hardness | Gas permeability (cm.²/sec.) |
| 1 | 1 | 10 | 50 | Phenol resin | 50 | 1.41 | 1.3 | 900 | 120 | 10⁻¹³ |
| 2 | 2 | 5 | 70 | Phenol resin / Pitch | 30 / 10 | 1.55 | 0.1 | 1,300 | 140 | 10¹³ |
| 3 | 3 | 20 | 70 | Phenol resin / Pitch | 30 / 10 | 1.45 | 0.5 | 1,100 | 129 | 10⁻¹² |
| 4 | 4 | 250 | 70 | Furfural resin / Pitch | 30 / 10 | 1.40 | 0.5 | 900 | 123 | 10⁻¹¹ |
| 5 | 5 | 100 | 60 | Phenol resin | 40 | 1.50 | 0.3 | 1,300 | 140 | 10⁻¹² |
| 6 | 6 | 10 | 70 | Phenol resin / Pitch | 5 / 30 | 1.38 | 2.0 | 900 | 130 | 10⁻¹⁰ |
| 7 | 7 | 10 | 70 | Pitch | 30 | 1.36 | 6.0 | 100 | 190 | 10⁻⁸ |

NOTE: 1. Phenol resin used is a Novolac type resin (BP–700) manufactured by Gunei Kagaku Kabushiki Kaisha, Japan. 2. Furfural resin used is one prepared by adding to monomeric furfural 5% by weight solution of p-toluene sulfonic acid as a curing agent. The substance is turned into a resin at an initial stage of the heat-treatment. 3. Pitch used is a coal pitch having a softening point of 80° C.

EXAMPLE 1

Pitch obtained from the petroleum cracking was melt-spun into fiber of 20 microns in diameter. This melt-spun pitch fiber was then heat-treated in an oxidizing gas containing therein 3% by volume of nitrogen dioxide ($NO_2$) by raising the heating temperature up to 250° C. at a rise rate of 1.5° C./mm., whereby organic fiber to be used for the present invention was obtained.

Thereafter, the organic fiber was subjected to various

EXAMPLE 2

Pitch obtained by the thermal cracking of petroleum naphtha was melt-spun into fibers having an average diameter of 20 microns. This pitch fiber was heat-treated in air containing therein 3% by volume of nitrogen dioxide ($NO_2$) to a temperature of 250° C. at a rise rate of 1.5° C./min., whereby organic fiber to be used for the present invention was produced. The resulted organic fiber was found to possess an H/C atomic ratio of 0.39, an ether-bonded type oxygen content of 9%, a carbonization yield of 79%, and a linear shrinkage of 15%.

This organic fiber was then cut into a length of 3 mm. in average (an average L/D of more than 150), to which a phenol resin binder was added and made into paper (the content of the phenol resin being 10%). When a part of this paper is heat-treated for carbonization in an inert gas up to a temperature of 1,000° C. by raising the temperature at a rise rate of 100° C./hr., a heat-resistant, electro-conductive carbonaceous paper having a paper weight of 40 g./m.$^2$ and strength of 60 g./cm. could be obtained. When this carbonaceous paper was further subjected to a heat-treatment in an inert gas atmosphere up to a temperature of 2,500° C., a graphite paper having extremely favorable pliability could be obtained.

On the other hand, the abovementioned raw material paper was impregnated with the phenol resin, and then the impregnated paper was formed into a laminated body under a pressure of 30 kg./cm.$^2$, which was subsequently heated to a temperature of 250° C. in air by raising the temperature at a rise rate of 2° C./hr., and further heated in an inert gas atmosphere to a temperature of 1,000° C. for carbonization at a rate of temperature increase of 10° C./hr. The resulted carbon article had a bulk density of 1.56 and an extremely high bending strength of 1,500 kg./cm.2. For the sake of reference, the bulk density of the article prior to the carbonization was 1.32, and the mixing ratio of the organic fiber and the binder was 60:40.

EXAMPLE 3

The organic fiber used in Example 2 above was cut into an average fiber length of 0.2 mm. (L/D ratio of approximately 10). 60 parts by weight of this fibril was mixed with 10 parts by weight of pitch having a softening point of 70° C. and 30 parts by weight of phenol resin, and well wetted by use of tetrahydrofuran. After removal of tetrahydrofuran, the mixture material was shaped into a tube having an outer diameter of 10 cm., an inner diameter of 8 cm., and a length of 100 cm. by means of an extruder. The thus shaped tube was heated for carbonization under the same condition as that of the laminated article in Example 2. The carbonaceous tubes was found to possess high mechanical strength and gas impermeable property as well as excellent acid resistant property.

The physical properties of the carbonaceous tube are as follows:

Strength against pressure: 2,000 kg./cm.$^2$
Acid resistance at 800° C.: 0.2 mg./cm.$^2$/hr.
Gas permeability: $10^{-13}$ cm.$^2$/sec.

EXAMPLE 4

The organic fiber of the specimen No. 4 in Example 1 above (the ether-bonded type oxygen content of 4%) was cut in length of 5 cm., which was then formed into a felt. Subsequently, emulsion of vinylidene chloride was applied onto this felt, dried, and heat-treated to a temperature of 2,800° C. for carbonization and graphitization by gradually raising the temperature. The resulted graphite felt had a bulk density of 0.2 and was extremely pliable.

EXAMPLE 5

The melt-spun pitch fiber as obtained in Example 1, which had already been heat-treated at 250° C., was further heat-treated at a temperature of 300° C. for 60 minutes in ammonia gas to manufacture organic fiber having the under-mentioned properties.

Ether-bonded type oxygen content: 9%
Hydrogen/carbon atomic ratio: 0.34
Carbonization yield: 88%
Linear shrinkage: 19%

The organic fiber thus produced was cut into a length of 1 mm., 60 parts by weight of which was mixed with 20 parts by weight of phenol resin and 10 parts by weight of pitch produced from the petroleum cracking and having a softening point of 130° C., and well wetted each other by use of tetrahydrofuran. After removal of the solvent, the mixture material was shaped into a plate having a dimension of 10 cm. long, 5 cm. wide, and 2 cm. thick under a shaping pressure of 20 kg./cm.$^2$ and at a temperature of 130° C. The plate was then heated in air by raising a temperature up to 250° C. at a rise rate of 10° C./hr., further heated to 1,000° C. in an inert gas atmosphere by raising the temperature at a rate of 20° C./hr., and furthermore heated to 2,900° C. at a rise rate of 100° C./hr., The resulted graphite plate had the following properties.

Bulk density: 1.78
Porosity: 2.5%
Bending strength: 900 kg./cm.$^2$

EXAMPLE 6

Pitch fiber having an average diameter of 10 microns and produced by melt-spinning raw material pitch obtained from the petroleum cracking was subjected to oxidation treatment by heating the same in air containing therein nitrogen dioxide ($NO_2$) at a ratio of 3% by volume to a temperature of 250° C. by gradually raising the temperature. The organic fiber thus obtained had the properties as shown below.

Composition due to elementary analyses (wt. percent): C, 81.5; H, 2.8; O, 15.3; N, 0.4
Hydrogen/carbon atomic ratio (H/C): 0.42
Ether-bonded type oxygen content: 10%
Linear shrinkage at 1,000° C.: 20%
Carbonization yield: 15%

This organic fiber was mixed with various kinds of organic binder and inorganic aggregate of carbonaceous aggregate, and mixture was subjected to heat-treatment. The results obtained are as shown in Table 3 below.

TABLE 3

| Run No. | Product | Aggregate Kind | Qty. (wt. part) | Organic fiber L/D | Qty. (wt. part) | Organic binder Kind | Qty. (wt. part) | Heating temp. (° C.) | Bulk density | Bending strength (kg./cm.$^2$) Normal temp. | 1,200° C. |
|---|---|---|---|---|---|---|---|---|---|---|---|
| 1 | Electrode | GL coke | 70 | 20 | 2 | Medium pitch | 30 | 1,000 | 1.50 | 230 | |
| 2 | do | do | 80 | 100 | 10 | do | 20 | 1,000 | 1.52 | 320 | |
| 3 | do | do | 80 | | | do | 20 | 1,000 | 1.51 | 150 | |
| 4 | Doromite brick | MgO | 60 | 20 | 0.5 | Coal tar | 10 | 1,100 | 3.18 | 290 | 130 |
| 5 | do | CaO | 30 | 20 | 3.0 | do | 10 | 1,100 | 3.19 | 330 | 200 |
| 6 | do | Iron oxide | 1.5 | | | do | 10 | 1,100 | 3.18 | 200 | 60 |
| 7 | Graphite brick | {Natural graphite / Schamott sand} | 40 / 13 | 20 | 1.0 | do | 10 | 1,300 | 1.91 | 128 | |
| 8 | do | Silicon carbide | 39 | 20 | 4.0 | do | 10 | 1,300 | 1.90 | 220 | |
| 9 | do | Alkali salt of iron oxide | 10 | | | do | 10 | 1,300 | 1.90 | 87 | |
| 10 | Alumina brick | {Alumina / Silica} | 60 / 30 | 20 | 1.0 | Medium pitch | 20 | 1,000 | 2.51 | 230 | |
| 11 | do | {Alumina / Silica} | 60 / 30 | 20 | 4.0 | do | 20 | 1,000 | 2.50 | 270 | |
| 12 | do | {Alumina / Silica} | 60 / 30 | | | do | 20 | 1,000 | 2.51 | 190 | |

EXAMPLE 7

The organic fiber obtained from the oxidation treatment in Example 6 above was further treated under the conditions as in Table 4 below, thereby obtaining various sorts of fibers. These fibers were used for reinforcement of bricks, the test results of which are shown in Tables 4 and 5.

TABLE 4.—PROPERTIES OF ORGANIC FIBERS

| Specimen number | Heat-treating conditions | Ether-bonded oxygen (wt. percent) | H/C atomic ratio | Linear shrinkage (percent) | Carbonization yield (wt. percent) | Treating time (min.) |
|---|---|---|---|---|---|---|
| 1 | At 600° C. in nitrogen | 4 | 0.25 | 5 | 92 | 120 |
| 2 | At 350° C. in air | 13 | 0.32 | 21 | 80 | 60 |
| 3 | At 400° C. in nitrogen of specimen No. 2 | 8 | 0.30 | 12 | 84 | 80 |
| 4 | At 100° C. in air containing 20 vol. percent of $NO_2$ | 13 | 0.29 | 18 | 82 | 60 |
| 5 | At 300° C. in ammonia | 9 | 0.34 | 19 | 88 | 60 |

TABLE 5.—PROPERTIES OF BRICKS MIXED WITH ORGANIC FIBER OF PRESENT INVENTION AND HEAT TREATED

| Product | Aggregate Kind | Qty. (wt. part) | Organic binder Kind | Qty. (wt. part) | Organic binder Kind | Qty. (wt. part) | Heating (° C.) | Bulk density | Bending strength (kg./cm.$^2$) |
|---|---|---|---|---|---|---|---|---|---|
| Electrode | GL coke | 70 | Specimen No. 1 in Table 4 | 2 | Medium pitch | 30 | 1,000 | 1.49 | 250 |
| Do | do | 80 | Specimen No. 2 in Table 4 | 10 | do | 20 | 1,000 | 1.52 | 330 |
| Do | do | 80 | Specimen No. 3 in Table 4 | 10 | do | 20 | 1,000 | 1.52 | 338 |
| Graphite brick | Natural graphite | 40 | Specimen No. 1 | 1 | Coal tar | 10 | 1,300 | 1.91 | 130 |
|  | Schamott sand | 13 | Specimen No. 2 | 4 | do | 10 | 1,300 | 1.90 | 230 |
|  | Silicon carbide | 39 | Specimen No. 4 | 4 | do | 10 | 1,300 | 1.91 | 290 |
|  | Alkali salt of iron oxide | 10 |  |  |  |  |  |  |  |
| Electrode | GL coke |  | Specimen No. 5 | 10 | Petroleum cracked pitch | 30 | 2,600 | 1.75 | 320 |

EXAMPLE 8

Polyacrylonitrile fiber having a diameter of 15 microns was heat-treated for 5 hours at a temperature of 220–240° C. in air containing therein 3% by volume of $NO_2$, during which time the fiber turned into black. This fiber was further heated to a temperature of 580° C. to finally obtain organic fiber of a diameter of 11 microns.

From the elementary analyses, this organic fiber was found to have an H/C atomic ratio of 0.22 and the oxygen content of 5.2% by weight. Also, from the infrared ray absorption spectrum analyses, no absorption due to C=O and OH groups could be recognized, but remarkable absorption due to C—O—C bonding of the ether-type. Furthermore, the chemical analyses did not detect existence of the peroxy group. In this consequence, the oxygen existing in their organic fiber could be identified to be substantially the same ether-bonded type oxygen. In addition, the residual carbon in this organic fiber, when it is heated in the argon atomspheres to a temperature of 1,000° C., i.e., the carbonization yield of the organic fiber, was found to be 85% by weight, and the linear shrinkage at that time was 7%.

This organic fiber was then cut into a fiber length of from 0.1 to 0.3 mm., and mixed with coal pitch of the same quality as used in Example 1 above at varying ratios, after which the mixture material was molded into articles having a dimension of 100 cm. long, 50 cm. thick under a molding pressure of 200 kg./cm.$^2$ and at a room temperature. The shaped articles were then subjected to heat-treatment in air up to 450° C. by raising the temperature at a rate of 2° C./hr., after which the article was buried in coke powder and heated for carbonization up to a temperature of 1,000° C. by raising the temperature at a rate of 10° C./hr.

The properties of the obtained carbon shaped articles are shown in the following Table 6.

TABLE 6

| Specimen No. | Organic fiber (wt. part) | Organic binder (wt. part) | Bulk density | Porosity (percent) | Bending strength (kg./cm.$^2$) | Shore hardness | Gas permeability (m.$^2$/sec.) |
|---|---|---|---|---|---|---|---|
| 1 | 0 | Phenol resin 50 / Coal pitch 50 | (*) |  |  |  |  |
| 2 | 60 | Phenol resin 20 / Coal pitch 20 | 1.41 | 5 | 1,050 | 127 | $10^{-11}$ |
| 3 | 70 | Coal pitch 30 | 1.38 | 7 | 900 | 127 | $10^{-10}$ |
| 4 | 40 | do 20 | 1.32 | 10 | 840 | 126 | $10^{-9}$ |

*Due to remarkable generation of cracks during the heat-treatment, no carbon shaped body could be obtained.

The above tests results indicate the effect of adding the organic fiber according to the present invention in respect of the gas impermeability, high hardness, and high mechanical strength. The specimen No. 3 was found to show such high density as that shown in FIGS. 1 and 2 of the drawing.

EXAMPLE 9

Fiber obtained by dry-spinning polyvinyl alcohol was heat-treated for 5 hours in air up to a temperature of 200° C., thereafter it was further treated in nitrogen up to 500° C. by raising the temperature at a rate of 3° C./min.

The thus obtained black fiber, as the result of analyses, was found to have a diameter of 14 microns, an H/C atomic ratio of 0.48, an ether-bonded type oxygen content of 8.9% by weight, a carbonization yield of 85%, and a linear shrinkage of 13%.

This organic fiber was cut into a fiber length of 3 mm., which was then blended with the organic binder and aggregate in various quantities as shown in the following Table 7, and molded into articles having a dimension of 16 cm. long, 4 cm. wide, and 4 cm. thick under an applied molding pressure of 100 kg./cm.$^2$ and at a temperature of 150° C.

These shaped articles were buried in coke powder, and carbonized in a furnace of an external heating type by raising the heating temperature up to 1,000° C. at a rise rate of 10° C./hr. The properties of the heat-treated articles are shown in Table 7, from which it is recognized that the bulk density, and mechanical strength of the shaped articles have improved through the use of the organic fiber according to the present invention.

TABLE 7

| Specimen No. | Organic fiber (wt. part) | Organic binder (wt. part) | Aggregate (wt. part) | | Bulk density | Bending strength (kg./cm.$^2$) | |
|---|---|---|---|---|---|---|---|
| | | | | | | Normal temp. | 1,200° C. |
| 1 | | Coal pitch 20 | GL coke* | | 80 | 1.51 | 150 |
| 2 | 1 | do 20 | do | | 80 | 1.51 | 180 |
| 3 | 5 | do 20 | do | | 80 | 1.52 | 260 |
| 4 | | Coal tar 10 | MgO | 60 | 3.18 | 200 | 60 |
| | | | CaO** | 30 | | | |
| | | | Fe$_2$O$_3$** | 1.5 | | | |
| 5 | 1 | do 10 | MgO | 60 | 3.19 | 290 | 130 |
| | | | CaO | 30 | | | |
| | | | Fe$_2$O$_3$ | 1.5 | | | |
| 6 | 5 | do 10 | MgO | 60 | 3.19 | 320 | 210 |
| | | | CaO | 30 | | | |
| | | | Fe$_2$O$_3$ | 1.5 | | | |

*GL coke . . . . . . a product fo Great Lakes Carbon Corporation which is in powder of 200 mesh under, and sold in brand name of "Wilminton".
**MgO, CaO . . . . . . in powder form having size distribution of: 20% of 0.125 mm. under, 30% of 1 mm. under, 30% of 1-2 mm., and 20% of 3-5 mm.
**Fe$_2$O$_3$ . . . . . . . . in powder form of 0.125 mm. under.

What we claim is:

1. In a method for producing shaped articles of carbon, wherein a mixture of a carbonizable binding material and an organic fiber with or without addition of an aggregate thereto is formed into a desired configuration, and then heat-treated for carbonization, or further graphitization, the improvement which comprises mixing an organic fiber produced by heat-treating a fiber as the starting material which has been spun from a substance selected from the group consisting of pitch, polyacrylonitrile, a polyvinyl alcohol, lignin, a phenol resin, and a furfural resin at a temperature of between normal temperature and 350° C. in an oxidizing gas atmosphere with an organic binding material having a carbonization yield of more than 10%, said organic fiber being a precursor for carbon fibers and constituting a bulk material as well as a reinforcing material for the shaped carbon article, and having an average fiber diameter of less than 40 microns, a ratio between the fiber length and the diameter of more than 5, a hydrogen/carbon atomic ratio (H/C) of from 0.25 to 0.8 based on the elementary analysis, an ether-bonded type oxygen content of from 3 to 15%, a carbonization yield of from 50 to 92%, and a linear shrinkage of from 4 to 25% at a temperature of 1,000° C.

2. A method as defined in claim 1, wherein said organic fiber is produced by heat-treating a fiber starting material which has been spun from pitch at a temperature of between normal temperature and 350° C. in an oxidizing gas atmosphere.

3. A method as defined in claim 1, wherein said organic fiber is produced by first heat-treating a fiber as the starting material which has been spun from a substance selected from the group consisting of polyacrylonitrile, a polyvinyl alcohol, lignin, a phenol resin, a furfural resin at a temperature of between normal temperature and 350° C. in an oxidizing gas atmosphere, and further heat-treating the thus heat-treated spun fiber to a temperature not exceeding 600° C. in an inert gas atmosphere.

4. A method as defined in claim 1, wherein said organic binding material is one selected from the group consisting of coal tar, coal pitch, petroleum pitch, petroleum tar, polyvinyl chloride, polyvinylidene chloride, polyacrylonitrile, a phenol resin, an epoxy resin, a diallyl phthalate resin, and an unsaturated polyester resin.

5. A method as defined in claim 1, wherein the added quantity of the organic binder is from 20 to 150 parts by weight per 100 parts by weight of the organic fiber.

References Cited

UNITED STATES PATENTS

| | | | |
|---|---|---|---|
| 3,367,812 | 2/1968 | Watts | 117—46 CC |
| 3,558,344 | 1/1971 | Peterson et al. | 117—46 CC |
| 3,573,086 | 3/1971 | Lambdin | 117—4 G |
| 3,427,120 | 2/1969 | Shindo et al. | 117—46 CC |

EDWARD G. WHITBY, Primary Examiner

U.S. Cl. X.R.

117—36 CG; 161—156; 260—37 R, 37 EP